United States Patent
Düll

[19]

[11] Patent Number: 6,131,520
[45] Date of Patent: Oct. 17, 2000

[54] RAIL VEHICLE

[75] Inventor: Hans-Jürgen Düll, Langensendelbach, Germany

[73] Assignee: Siemens Aktiengesellschaft, Munich, Germany

[21] Appl. No.: 09/171,244

[22] PCT Filed: Apr. 7, 1997

[86] PCT No.: PCT/DE97/00702

§ 371 Date: Oct. 14, 1998

§ 102(e) Date: Oct. 14, 1998

[87] PCT Pub. No.: WO97/39911

PCT Pub. Date: Oct. 30, 1997

[51] Int. Cl.[7] .................................................. B61F 3/00
[52] U.S. Cl. ................ 105/199.2; 105/164; 105/199.1
[58] Field of Search .................................. 104/165, 164; 105/199.1, 199.2, 164; 191/45 R

[56] References Cited

U.S. PATENT DOCUMENTS

| 3,818,841 | 6/1974 | Julien ....................................... 105/164 |
| 3,844,225 | 10/1974 | Di Majo ................................... 105/164 |
| 3,845,724 | 11/1974 | Boocock et al. ........................ 105/164 |
| 3,868,911 | 3/1975 | Schultz .................................... 105/164 |
| 4,267,736 | 5/1981 | Westbeck ................................. 105/164 |
| 4,440,093 | 4/1984 | Kakehi et al. ........................... 105/164 |
| 4,471,175 | 9/1984 | Gronlund ............................. 105/199.1 |
| 4,516,507 | 5/1985 | Dean, II ............................... 105/199.1 |
| 5,564,342 | 10/1996 | Casetta et al. ....................... 105/199.2 |

FOREIGN PATENT DOCUMENTS

| 0 485 273 | 5/1992 | European Pat. Off. . |
| 22 43 405 | 3/1973 | Germany . |
| 32 32 153 | 3/1983 | Germany . |
| 05115104 | 5/1993 | Japan . |
| WO 97/03858 | 2/1997 | WIPO . |

*Primary Examiner*—Stephen Avila
*Assistant Examiner*—Lars A. Olson
*Attorney, Agent, or Firm*—Kenyon & Kenyon

[57] ABSTRACT

A rail vehicle having at least one superstructure which can be inclined by an angle of inclination ($\alpha$) and which is supported on at least one undercarriage. At least one current collector arranged on the roof of the rail vehicle, the current collector being retractable against the inclination of the superstructure by an adjustment angle which is formed by the difference between the angle of inclination ($\alpha$) and the roll angle ($\beta$).

7 Claims, 4 Drawing Sheets

RAIL VEHICLE

BACKGROUND OF THE INVENTION

The present invention concerns a rail vehicle having at least one inclinable superstructure with one current collector. Such a vehicle is described in European Patent No. 485,273 A1. According to this known case, the superstructure is supported on two bogies each having a pendulum carrier and a spring system. When turning, the superstructure can be inclined by an angle of inclination $\alpha$ with respect to the travel path (top edge of the track). Angle of inclination $\alpha$ thus also includes the inclination of the pendulum carrier with respect to the travel path, which is defined as roll angle $\beta$. Roll angle $\beta$, which describes the spring deflection of the superstructure, also depends on the centrifugal force that occurs in turning. Simultaneously with the inclination of the superstructure by its angle of inclination $\alpha$, the current collector is retracted against the inclination of the superstructure, taking into account the angle of inclination $\alpha$. Roll angle $\beta$ is not taken into account in the guidance of the current collector, so there may be great deviations, possibly even inadmissable deviations from the middle position of the current collector relative to the plane of the contact wire or to the structure clearance of the superstructure, especially with traction vehicles that have a soft spring suspension for comfort.

Another rail vehicle with an inclinable superstructure is described in German Patent No. 32 32 153 C2. A current collector is arranged on the roof of the superstructure and is joined with an articulation to a column attached to the bogie. The current collector is thus held in a certain position in relation to the bogie. The column, which runs mostly inside the superstructure, passes through the roof of the superstructure. Again in this case, roll angle $\beta$ is not taken into account in guiding the current collector.

SUMMARY OF THE INVENTION

The object of the present invention is a rail vehicle with an inclinable superstructure, where the current collector can be aligned approximately centrally with the contact wire even in turning.

The rail vehicle according to the present invention includes at least one superstructure which can be inclined by an angle of inclination $\alpha$ and is supported on at least one undercarriage, with at least one current collector arranged on its roof. The current collector can be retracted against the inclination of the superstructure by an adjustment angle $\gamma$. According to the present invention, adjustment angle $\gamma$ is formed by the difference between angle of inclination $\alpha$ and roll angle $\beta$.

With such a rail vehicle, roll angle $\beta$ is taken into account in guiding the current collector. The manipulated variable for the current collector is thus no longer only angle of inclination $\alpha$, but also adjustment angle $\gamma$, which is formed by the difference between angle of inclination $\alpha$ and roll angle $\beta$. This ensures that, regardless of the type of spring suspension of the vehicle or the type of undercarriage and regardless of the centrifugal forces and crosswind effects, the current collector is always aligned approximately centrally with the contact wire when the superstructure is inclined. Due to the more accurate alignment of the current collector with the plane of the contact wire, the contact quality is improved in current collection, and wear on the drag strip of the current collector is reduced.

BRIEF DESCRIPTION OF THE DRAWINGS

Additional advantages and details of the present invention are further described below in conjunction with the drawings.

DETAILED DESCRIPTION

Figure 1:
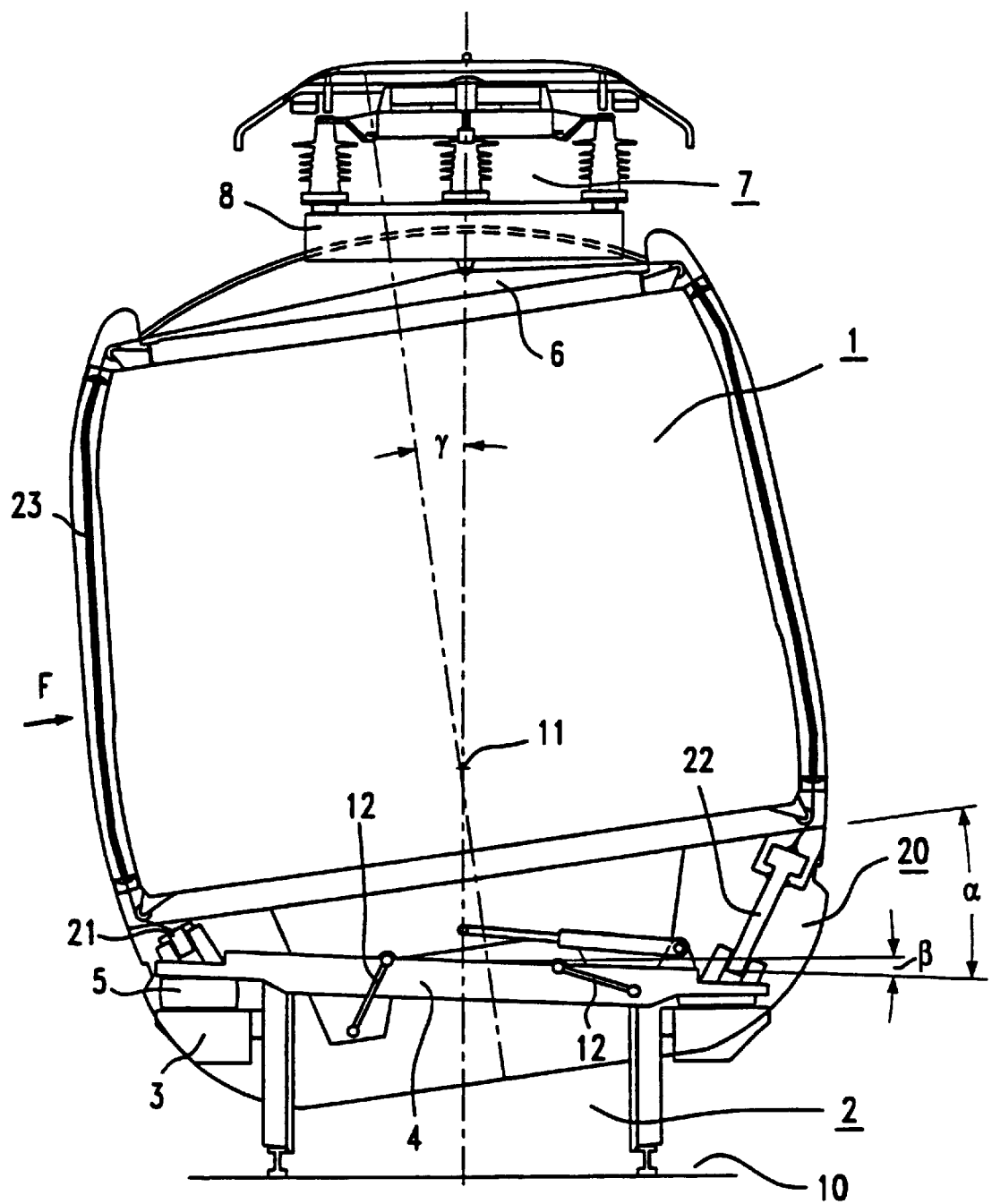
FIG. 1 is a cross-sectional view taken through a first embodiment of a vehicle constructed according to the principles of the invention, showing also the area of the undercarriage.
Figure 2:
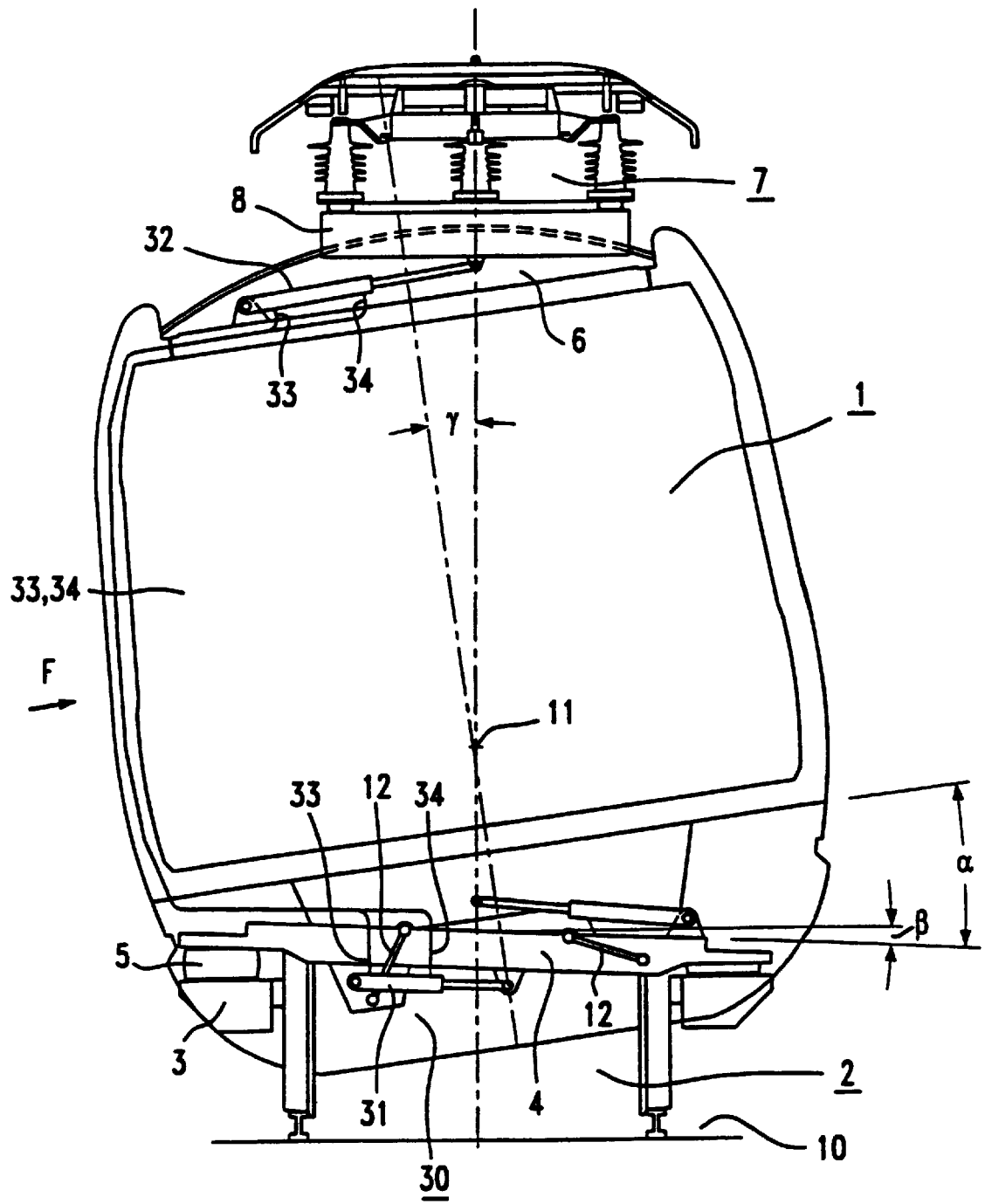
FIG. 2 is a cross-sectional view similar to that of FIG. 1, illustrating a second embodiment of the vehicle.

FIGS. 1 and 2 show a superstructure 1 supported on two undercarriages 2. Undercarriages 2 each include a bogie 3 and a pendulum carrier 4 which is supported elastically on bogie 3 by a spring system 5. Pendulum carrier 4 is connected to superstructure 1 by a four-bar linkage 12. Only one of the two undercarriages 2 is visible in FIGS. 1 and 2. A current collector 7 with its carrier 8 is arranged on the roof 6 of superstructure 1.

Superstructure 1 can be inclined in turning by an angle of inclination $\alpha$ relative to travel path 10 (top edge of the track) by an actuator, with the tilting pole of superstructure 1 labeled as 11. Due to centrifugal force F, pendulum carrier 4 is inclined by roll angle $\beta$ relative to travel path 10. Current collector 7 can be retracted by an adjustment angle $\gamma$ against the inclination of superstructure 1, with adjustment angle $\gamma$ being formed according to the present invention from the difference between angle of inclination $\alpha$ and roll angle $\beta$.

Adjustment angle $\gamma$ may be formed, for example, by active closed-loop and/or open-loop control. In this case, control signals are formed from the measured values of a sensor system detecting angle of inclination $\alpha$ and roll angle $\beta$ and relayed to an electric or hydraulic actuator. It is especially advantageous, however, to provide passive guidance for current collector 7, i.e., guidance without an intermediate device such as a closed- and/or open-loop control system.

Figure 3:
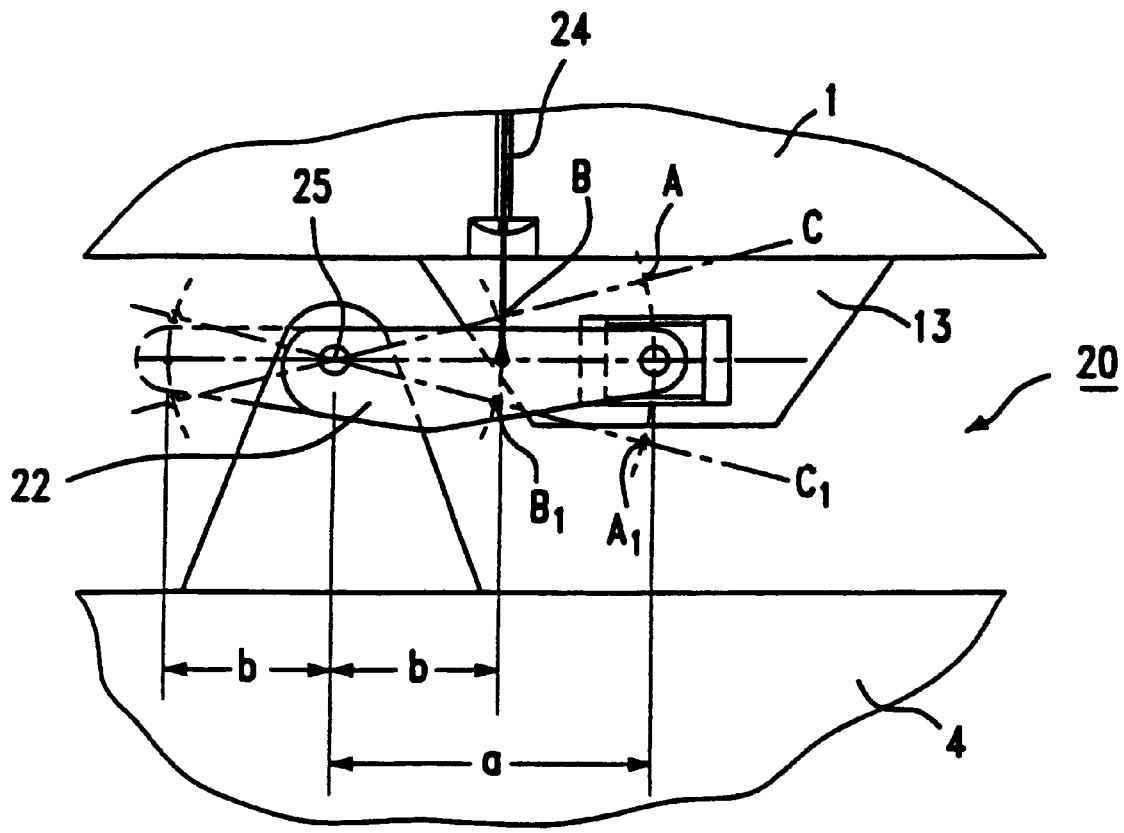
FIG. 3 is a side view of a first embodiment of a mechanical adjusting device for a current collector.
Figure 4:
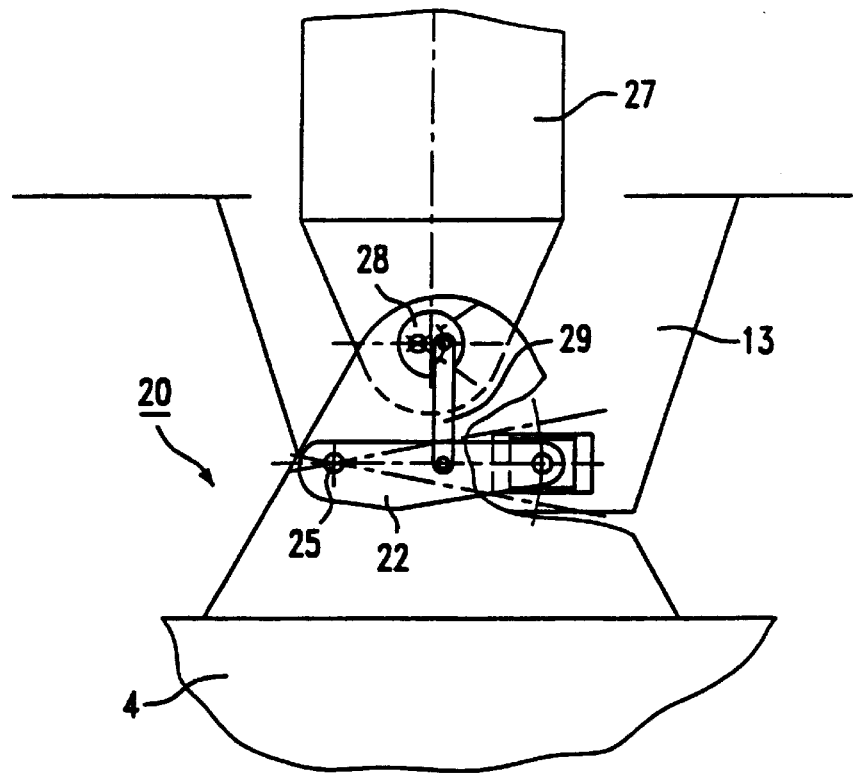
FIG. 4 is a side view of a second embodiment of a mechanical adjusting device for a current collector.

In the rail vehicle illustrated in FIG. 1, the difference between angle of inclination $\alpha$ and roll angle $\beta$, i.e., adjustment angle $\gamma$, is formed by a mechanical adjusting device 20, one embodiment of which is illustrated in each of FIGS. 3 and 4.

Figure 5:
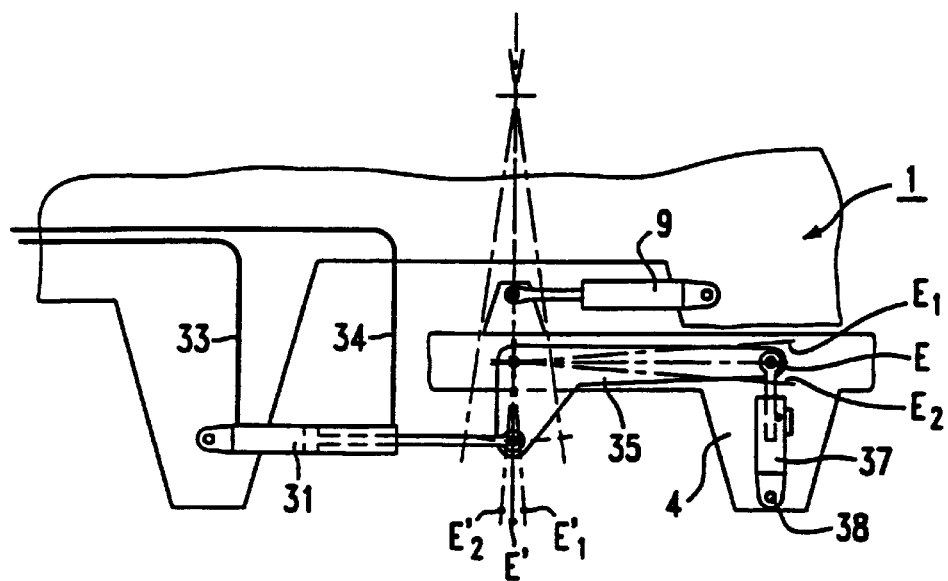
FIG. 5 is a side view of a hydraulic adjusting device for a current collector.

The rail vehicle according to FIG. 2 has a hydraulic adjusting device 30 which likewise forms adjustment angle $\gamma$ from the difference between angle of inclination $\alpha$ and roll angle $\beta$; one embodiment of this device is shown in detail in FIG. 5.

With the rail vehicle illustrated in FIG. 1, mechanical adjusting device 20 includes two articulated levers 21 and 22, each connected at one end to superstructure 1 and at the other end to pendulum carrier 4.

Articulated levers 21 and 22 operate in opposition to one another. For example, if articulated lever 22 is in its top position, then articulated lever 21 is in its bottom position.

The end of articulated lever 21 mounted in superstructure 1 is connected to a cable 23, and the end of articulated lever 22 which is also mounted in superstructure 1 is connected to cable 24. Both cables 23 and 24 are guided with their free ends on carrier 8 of current collector 7.

Depending on the position of two articulated levers 21 and 22, current collector 7 is retracted by an adjustment angle $\gamma$ against the inclination of superstructure 1 with the rail vehicle illustrated in FIG. 1.

Because of the arrangement of articulated levers 21 and 22 between superstructure 1 and pendulum carrier 4, adjustment angle γ is formed from the difference between angle of inclination α and roll angle β.

In the embodiment illustrated in FIG. 3, articulated lever 22 of mechanical adjusting device 20 is mounted rotatably on pendulum carrier 4 and rotatably and displaceably on bearing 13 of superstructure 1. When superstructure 1 is inclined laterally, articulated lever 22 moves into respective position C or $C_1$.

Cable 24 is coupled to articulated lever 22 so that adjustment distance $A–A_1$ of angle of inclination α is converted to adjustment distance $B–B_1$ of adjustment angle γ for current collector 7 by corresponding lever distances a, b from lever fulcrum 25. Compensation of different adjustment distances for cable 24 may be contained in adjustment distance $B–B_1$. Therefore, articulated lever 22 may also be moved by a motor actuator (electric motor or hydraulic motor) similarly to angle of inclination α of superstructure 1.

The other part of mechanical adjusting device 20, which includes articulated lever 21 with its cable 24, has an identical design.

Instead of cables 23 and 24, mechanical adjusting device 20 may also have a rigid connection 27 to carrier 8 of current collector 7 (FIG. 4).

Rigid connection 27 is connected to articulated lever 22 by a cam plate 28 and a cam arm 29. Cam plate 28 is therefore rotatably mounted in rigid connection 27. Cam plate 28 may also be motor driven in the present case.

Hydraulic adjusting device 30 includes two hydraulic cylinders 31 and 32 in the rail vehicle illustrated in FIG. 2. Hydraulic cylinder 31 is rotatably mounted at one end in bearing 13 of superstructure 1 and at its other end (pusher rod) on pendulum carrier 4. Hydraulic cylinder 32 is rotatably mounted at one end on roof 6 of superstructure 1 and at its other end (pusher rod) on carrier 8 of current collector 7. Both hydraulic cylinders 31 and 32 are interconnected by hydraulic lines 33 and 34 having a common compensating container (not visible in FIG. 1).

Both hydraulic cylinders 31 and 32 work in the same sense, i.e., when the superstructure is inclined, the pusher rods move out of hydraulic cylinders 31 and 32. The movement of the pusher rod with hydraulic cylinder 31 is transmitted in the same direction to the pusher rod of hydraulic cylinder 32 by hydraulic lines 33 and 34, so that carrier 8 of current collector 7 is adjusted by an adjustment angle γ.

Because of the arrangement and dimensions of hydraulic cylinder 31 between superstructure 1 and pendulum carrier 4, only the difference between angle of inclination α of superstructure 1 and roll angle β is transmitted as the manipulated variable.

One embodiment of the hydraulic adjusting device 30 is illustrated in greater detail in FIG. 5. Hydraulic cylinder 31 is connected to an electric actuator 37 (e.g., an electric lifting cylinder) by a lever 35, which is rotatably mounted on pendulum carrier 4 in an articulated joint. Electric actuator 37 is also rotatably mounted on pendulum carrier 4 by an articulated joint 38. Precision adjustment of adjustment angle γ is accomplished with hydraulic adjustment device 30 illustrated in FIG. 5 by a change in lift from E to $E_1$ or $E_2$ or from E' to $E'_1$ or $E'_2$.

What is claimed is:

1. A rail vehicle comprising:
   at least one superstructure which can be inclined by an angle of inclination (α) and which is supported on at least one undercarriage; and
   at least one current collector located on the roof of the superstructure, the current collector being retractable against the inclination of the superstructure by an adjustment angle (γ) formed by the difference between the angle of inclination (α) and a roll angle (β).

2. A rail vehicle as set forth in claim 1, wherein the undercarriage comprises a bogie and a spring-mounted pendulum carrier.

3. A rail vehicle as set forth in claim 1, wherein the adjustment angle (γ) is set by a mechanical adjusting device.

4. A rail vehicle as set forth in claim 1, wherein the adjustment angle (γ) is set by a hydraulic adjusting device.

5. A rail vehicle as set forth in claim 3, wherein the mechanical adjusting device has at least two articulated levers arranged between the superstructure and the pendulum carrier and connected to the current collector by at least one cable.

6. A rail vehicle as set forth in claim 4, wherein the hydraulic adjusting device has at least two hydraulic cylinders, one of the hydraulic cylinders being arranged between the superstructure and the pendulum carrier, and the other of the hydraulic cylinders being mounted on the roof of the superstructure and connected to the current collector.

7. A rail vehicle as set forth in claim 4, further comprising an electric actuator for provided precision adjustment of the adjustment angle (γ).

* * * * *